Patented Nov. 3, 1931

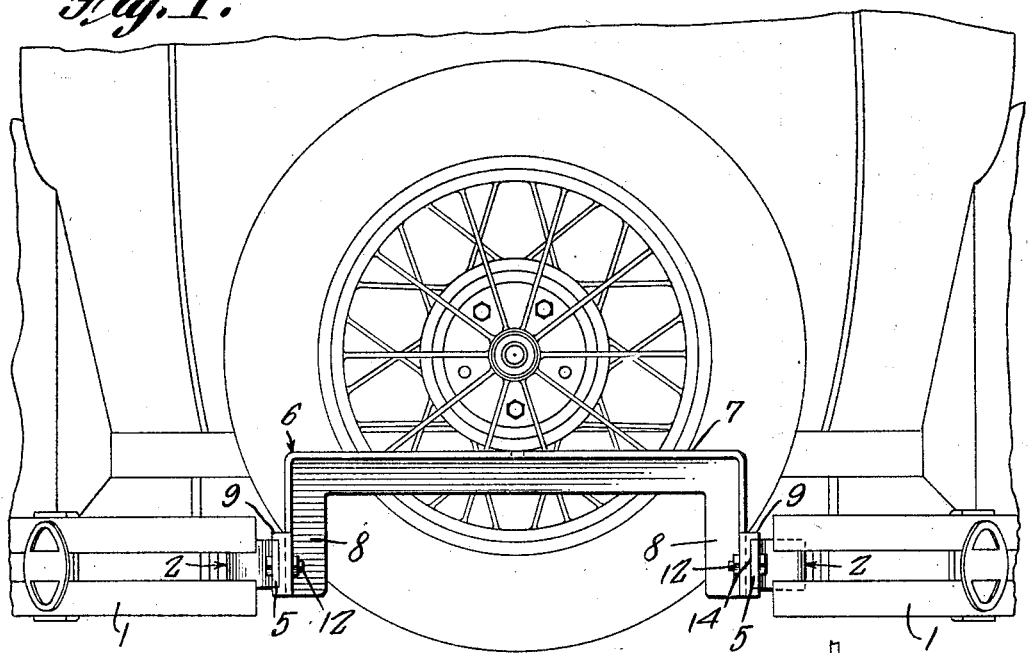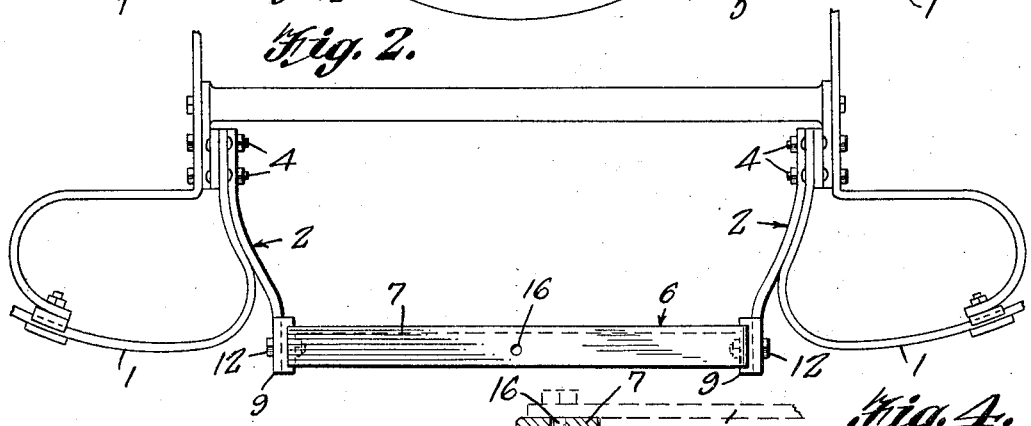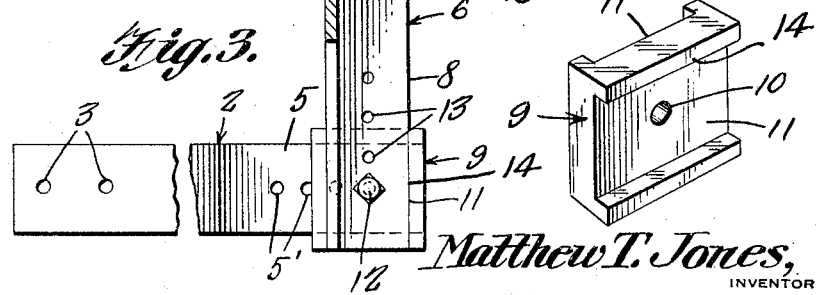

1,830,467

UNITED STATES PATENT OFFICE

MATTHEW T. JONES, OF BLACKWELL, OKLAHOMA

HITCH AND TIRE PROTECTOR

Application filed December 6, 1929. Serial No. 412,223.

This invention relates to a novel combined hitch and protective attachment for the rear bumpers of an automobile to constitute, in one instance, means to which a traction member may be connected for the purpose of towing another vehicle or the like and, in another instance, to constitute means for protecting any spare tires that may be carried at the back of the automobile and also reenforce the bumpers so that, in the event of collision, the spare tire or tires will not be liable to be damaged, and a maximum resistance will be offered by the reenforced bumpers, to prevent breakage thereof.

Another object of the invention is to provide a device for this purpose which may be conveniently applied to the rear bumpers of any of the ordinary makes of automobiles and adjusted in such a manner as to adapt the device to the bumpers, at the inner sides thereof, and at the same time vertically adjusted with respect to the bumpers and the spare tire carrier.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view in rear elevation of the device embodying the invention mounted upon the rear bumpers of an automobile.

Figure 2 is a top plan view of the device so mounted.

Figure 3 is a detail view partly in elevation and partly in section illustrating the device.

Figure 4 is a perspective view in detail of a member of the device.

In the drawings the numeral 1 indicates the rear bumpers of an automobile, which bumpers are of the usual type and are secured at the opposite sides of the rear end of the body of the automobile. In connection with each of the bumpers there is provided a supporting arm constituting a part of the present invention, and indicated in general by the numeral 2, and each arm is formed at its forward end with spaced bolt openings 3 through which bolts 4 may be secured for the purpose of securing the arm against the inwardly presented side of the respective bumper 1, it being observed by reference to Figure 2 of the drawings that the forward portion of each arm is curved to conform to a lateral and rearward curvature of the respective side of the said bumper, and that the rear portion of each arm, indicated by the numeral 5 extends directly rearwardly, parallel to the line of travel of the automobile and is formed with a series of openings indicated by the numeral 5'.

In connection with the arms 2, above referred to, there is provided a protective and bracing member, of the device, which is indicated in general by the numeral 6, and which is preferably of L-iron material and comprises a straight horizontally extending top portion 7 and downwardly right angularly extending side portions 8, these latter portions extending between and being supported by the arms 2, at the rear ends of said arms, by a means and in a manner which will now be described.

In mounting the member 6 between the arms 2, there is provided a pair of locking and bracing members, indicated by the numeral 9, and each of these members comprises a rectangular body of cast metal provided centrally with an opening 10 and formed in each face with a recess 14 extending between and parallel to the upper and lower edges of the member, in the instance of one face, and between and parallel to the forward and rear edges of the member, in the instance of the other face, so that the recesses are disposed at right angles to each other. In the use of these members 9 each member is disposed, and has its horizontal recesses 11, extending against the rear end of the respective arm 2, at the inner side of said arm, the arm at its end being received within the recess and the corresponding downwardly extending portion 8 of the member 6 has its outer flange disposed in the recess 11 in the other face of the said member 9, and when the parts have been thus assembled, the members 9 may be adjusted along the arms 2, at the outer ends of said arms, to suitably space the member 6 with respect to the spare tire or tires, and the member 6 may be, at the same time, vertically adjusted at its side portions 8, in the recesses 11 in the opposing sides of the member 9 to assume the desired vertical position with respect to the spare tires, whereupon the bolt 12 is fitted through the opening 10 of each member 9 and that one of the openings 5' in the outer end portion of the respective arms 2, which is in registration with the openings 10, and likewise through that one of a series of openings 13, which are formed in the rearwardly extending flange of the member 6, which opening is in registration with the opening 10, and a nut 14 is applied to the bolt and is tightened and it will now be evident that the members 9 constitute a very secure means for connecting the member 6 for adjustment with respect to the arms 2 by which it is supported and that the said member 6 may be adjusted not only forwardly and rearwardly with respect to the spare tire or tires, and depending upon whether one or more spare tires are mounted upon the rear of the automobile body, but may also be adjusted vertically so as to extend in proper position transversely in the rear of the tire or tires, and this member serves not only to prevent impact of a colliding machine with the tire or tires but also as a means for bracing and strengthening the bumpers 1, so that there will be no likelihood of the leaves of either of the bumpers being snapped in two in the event of collision.

In order that the member 6 may be utilized as an attaching member for a draft bar or the like, illustrated in broken lines in Figure 3 and indicated by the numeral 15, an opening 16 is formed in the horizontal flange of the portion 7 of the member 6 intermediate the ends of said portion so that a bolt or other connecting element may be secured through this opening to connect the draft member, with the member 6, the member 15 being of course rearwardly any required distance and being connected at its rear end in any suitable manner to the automobile or the like to be towed.

What I claim is:—

1. In an attachment of the class described, arms for connection with the respective adjacent sides of the rear bumpers of an automobile, and a protective and bracing member comprising a horizontal cross piece and depending side members adjustably mounted upon the said arms.

2. In an attachment of the class described, arms for connection with the respective adjacent sides of the rear bumpers of an automobile, and a protective and bracing member comprising a horizontal cross piece and depending side members adjustably mounted upon the said arms, the mounting means comprising a locking and bracing member having its opposite sides recessed to accommodate, at one side, the rear end of one arm, and, at its other side, the respective depending side member, the said depending side member and the respective arm having bolt openings therein extending longitudinally thereof, and a bolt secured through each of said locking and bracing members and interchangeably engageable through the bolt openings in the arm and depending member.

3. In an attachment of the class described, arms for connection with the respective adjacent sides of the rear bumpers of an automobile, and a protective and bracing member comprising a horizontal cross piece and depending side members adjustably mounted upon the said arms, the protective and bracing member being of L-iron construction and provided in the horizontal flange of its upper cross piece, with an opening, whereby a towing member may be connected with the said protective and bracing member.

4. In combination, a vehicle, supporting means secured thereto, impact bars secured to said supporting means, each of said impact bars being formed with a reversely curved portion adjacent the connection of said bars with said supporting means, and a connecting member having the ends thereof secured to said supporting means and having curved portions adjacent its ends engaging the reversely curved portions of said bars.

5. In combination with a vehicle having bumperette supports, a pair of bumperettes carried by said supports, said bumperettes having curved portions extending inwardly of said supports, and a connecting member having curved portions engaging the inwardly extending curved portions of said bumperettes.

6. In combination, a vehicle, bumperette supporting means, a pair of bumperettes having inner end portions thereof clamped to said supporting means and having adjacent said clamped end portions curved portions extending inwardly of said supporting means, and a connecting member having forwardly extending arms clamped to said supporting means, said arms being formed with curved portions correspondingly shaped and interengaging with the inwardly extending curved portions of said bumperettes.

7. A bumperette connecting member comprising a bar provided with forwardly extending arms, said arms having substantially straight end portions adapted to be clamped to the bumperette supporting means and also having curved portions adjacent said straight portions adapted to engage curved portions of the bumperettes.

8. A bumperette connecting member comprising a bar provided with forwardly extending arms, said arms having substantially straight end portions adapted to be clamped to the bumperette supporting means and also having curved portions adjacent said straight portions adapted to engage curved portions of the bumperettes which extend inwardly of said supporting means.

9. A connecting member for fender guards comprising a bar provided with forwardly extending arms adapted to be clamped to the guard supports by the same means which secures the guards to said supports and which arms engage the guards rearwardly of the clamping means.

In testimony whereof I affix my signature.

MATTHEW T. JONES.